UNITED STATES PATENT OFFICE.

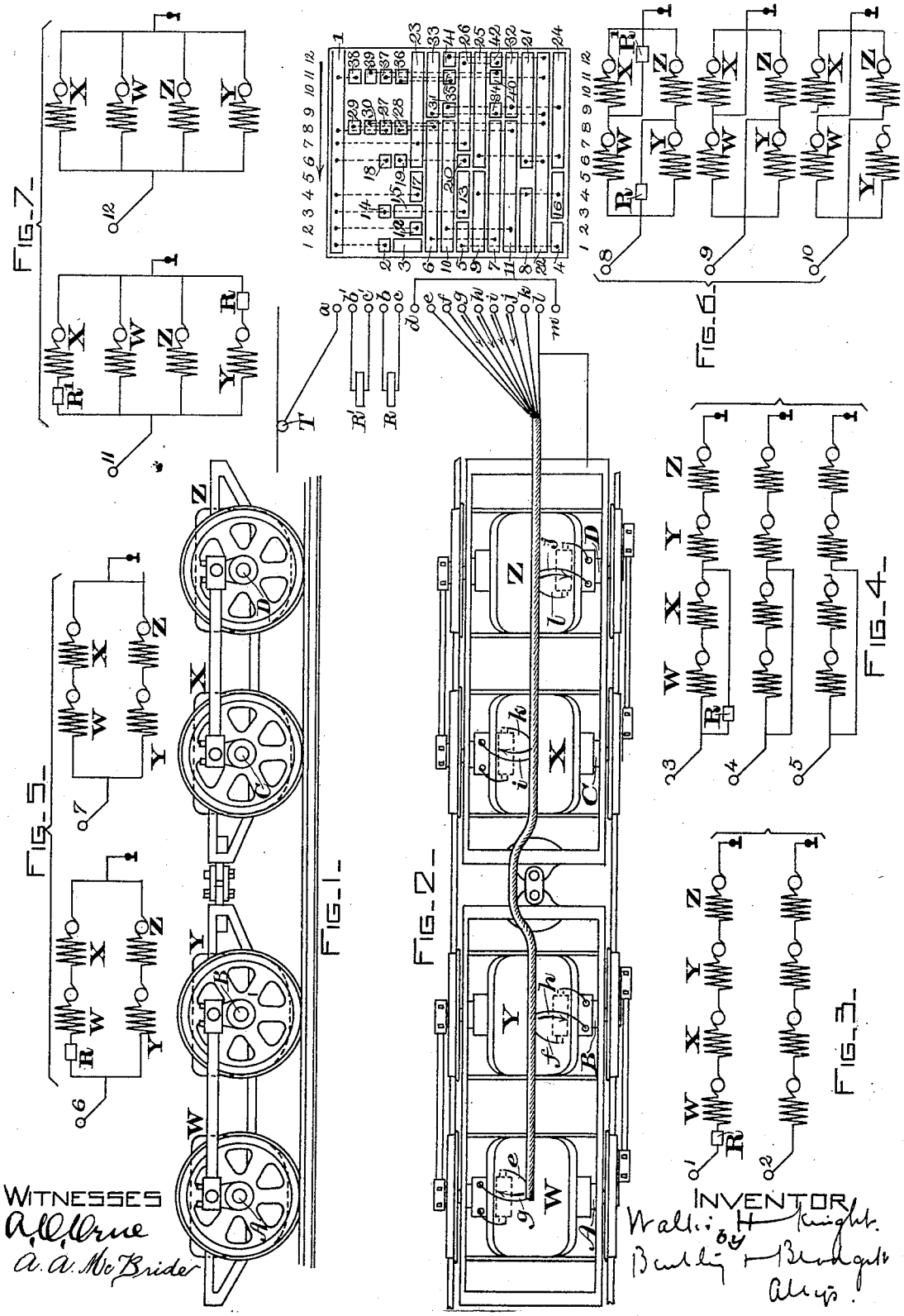

WALTER H. KNIGHT, OF LYNN, ASSIGNOR TO THE GENERAL ELECTRIC COMPANY, OF BOSTON, MASSACHUSETTS.

ELECTRIC LOCOMOTIVE.

SPECIFICATION forming part of Letters Patent No. 520,787, dated June 5, 1894.

Application filed January 18, 1894. Serial No. 497,240. (No model.)

*To all whom it may concern:*

Be it known that I, WALTER H. KNIGHT, a citizen of the United States, residing at Lynn, in the county of Essex and State of Massachusetts, have invented a certain new and useful Improvement in Electric Locomotives, of which the following is a specification.

My invention relates to electric locomotives in which there are two or more axles each provided with a driving motor and in which the several motors are provided with a controller which is in effect a switch for connecting the motors either in series or in parallel and also preferably at intermediate points in series-parallel groups. It has been found that with controllers of this type, it is necessary that one or more of the motors must be momentarily shunted in passing from the series to the parallel connection. Of course when this takes place the shunted motor loses much of its power and the work of propelling the vehicle is thrown largely upon the active motor. This is a serious evil which has been encountered in the use of series-parallel controllers, for, on account of the sudden inequality in load placed upon the respective motors by the action of the controllers in changing from series to parallel, as above described, the weakening of one motor tends to cause a sudden diminution in the speed of the vehicle which is not overcome by the increased activity of the other motor, for with such increased activity, there is provided no corresponding increase in the weight on its wheels so that even if one motor is sufficient for a short time to accomplish the work of both motors, it is not permitted to do it and the speed of the car drops in consequence. This drop in speed is followed by a sudden plunge forward disagreeable and dangerous to passengers and injurious to trains while impairing the effectiveness of the motors. A further evil result is that the wear upon the wheels of one axle becomes excessive as compared with the wear upon the other axle because it is customary in controlling the motors to select one of each pair which is to be the one that is shunted by the operation of the controller. I have therefore provided that in locomotives where a single motor is connected to each axle there shall be means for mechanically connecting the axles so that the active motor shall have the tractive effect which pertains to both of them. When four motors are to be employed in driving as many different axles I apply to them also this principle of mechanically connecting an axle driven by a motor that is active to one driven by a motor that is occasionally inactive. To effect this I divide the motors and axles into groups of two and mechanically connect each pair of axles preferably independently of the other pair. I then compose each pair of motors so if one is shunted or otherwise inactive at times, the other may be active, thus in any event one motor of each pair shall be always active.

My invention is illustrated in the accompanying drawings, in which—

Figure 1 is a side elevation of a vehicle having four axles. Fig. 2 is a plan of the same with a diagram of the controller, and Figs. 3, 4, 5, 6 and 7 represent respectively the connections of the various motors corresponding to the successive regulating steps.

Referring to Fig. 1, A, B, C and D represent respectively four axles of the vehicle and these axles are adapted to be driven respectively by the corresponding motors W, Y, X and Z. It is of course, to be understood that these four axles each with its pair of wheels may be placed under one vehicle or at any points along a train of vehicles, the essential feature being that they shall all act simultaneously upon a common load, whether the load be a single vehicle or a train of vehicles. It will also be understood that these axles may either be grouped in pairs to make special trucks or may be applied more or less directly to the body of the vehicle. In the present instance it is understood that the vehicle is provided with two trucks each having two axles and four wheels, the connection shown between the two trucks being intended to represent any flexible connection allowing independent movement of the respective trucks. The controller which I employ with these motors is not one for which I make any claim herein, the same being claimed so far as it is of my invention in another pending application. In general this controller consists of a switch, a plan of which is seen in Fig. 2. This switch is provided with a series of contact plates adapted to come in contact successively with a series of points or brushes forming the terminals of the respective circuits. These contact plates are referred to by numbers, and the stationary row of brushes is lettered $a, b', c', b, c, d, e, f, g, h, i, j, k, l, m$. The resistances are marked R and R' and there are twelve different positions which the switch may assume and may thereby effect some change in the electrical connections.

If the switch cylinder is moved so the lines of contacts indicated by 1—1, 2—2, &c., touch the row of brushes, then the different arrangements of the motors indicated by the diagrams, Figs. 3 and 7 result, and the circuits may be traced as follows:

With the brushes on line 1—1, the circuit will be from trolley T, brush $a$, block 1, block 2, brush $b$, resistance R, brush $c$, block 3, brush $d$, brush $m$, block 4, block 5, brush $g$, motor W, brush $e$, block 6, block 7, brush $i$, motor X, brush $k$, block 8, block 9, brush $h$, motor Y, brush $f$, block 10, block 11, brush $j$, motor Z to ground. With the brushes in this position the four motors and the resistance are in series.

With the brushes on line 2—2, the circuit will be the same as the above with the exception that the resistance R is cut out and current enters by block 12 and brush $d$.

With the brushes on line 3—3, the current from block 1 goes to block 13, thence by the paths already described through all the motors in series to ground, while a shunt path goes to block 14, brush $b$, resistance R, brush $c$, block 15, brush $d$, brush $m$, block 16 to block 8 and uniting with current from motors W and X passes as above described through the two other motors to ground. Position 3 places the four motors in series with a resistance loop around the first two, continuing the rotation of the cylinder in the direction of the arrow until the brushes rest on the line 4—4; the motors are connected as above with the exception that the resistance R is cut out of the loop, and the first two motors are shunted, the current entering by block 17 and brush $d$, and the next position of the cylinder breaks the connection between the motors X and Y, and leaves the motors Y and Z alone connected in series.

With the brushes on the line 6—6, the circuit will be from trolley T to block 1, block 18, brush $b$, resistance R, brush $c$, block 19, block 20, brush $g$, motor W, brush $e$, block 6, block 7, brush $i$, motor X, brush $k$, block 21, block 22, brush $l$ to ground. From block 1 a branch is taken to block 23, brush $d$, brush $m$, block 24, block 25, brush $h$, motor Y, brush $f$, block 10, block 11, brush $j$, motor Z to ground. With the brushes placed in this connection, motors W and X are in series with resistance and in parallel to motors Y and Z, which are connected together in series.

With the brushes on the line 7—7, the connections will be the same as above with the exception that the resistance R is cut out, the current entering by block 23 and dividing through brush $d$ and block 26, and thus leaves the motors connected, two in series on a side and the sides connected in parallel.

With the brushes on the line 8—8, the motors are arranged as in position 7, but with resistance loops around the motors Y and X. The loop for motor Y starting from block 1 passes to block 27, brush $b$, resistance R, brush $c$, block 28, to block 11 and unites with current from motor Y to pass through motor Z to ground; while the loop for motor X starting from block 6 passes to block 29, brush $b'$, resistance R', brush $c'$, block 30, block 22 and brush $l$ to ground.

At the ninth position, while the general arrangement of the motors is similar to the last, the current has a path from block 24, to block 25, brush $h$, motor Y, brush $f$, block 31 to block 32; here joining a direct path from block 24 to pass by brush $j$ and motor Z to ground. The current from block 26 goes by brush $g$ to motor W, brush $e$, block 33 to block 34 and directly by block 22 and brush $l$ to ground. There is also a shunt path from block 34 to brush $i$, motor X, brush $k$, blocks 21, 22 and brush $l$ to ground. These direct paths around the motors Y and X render them inactive and when the switch is moved to the next notch their circuits are interrupted, leaving the motor W in one branch and the motor Z in the other branch.

The eleventh position does not change motors W and Z but the current from block 23 passes by brushes $d$ and $m$ to blocks 24 and 25, brush $h$, motor Y, brush $f$, blocks 35 and 36, brush $c$, resistance R, brush $b$, blocks 37, 22 and brush $l$ to ground. The current also passes from block $l$, to block 38, brush $b'$, resistance R', brush $c'$, blocks 39 and 40, brush $i$, motor X, brush $k$, blocks 21, 22 and brush $l$ to ground.

The last position causes the current to pass from block 24, to block 25, brush $h$, motor Y, brush $f$, blocks 41, 22, and brush $l$ to ground; also from block 26 to block 42, brush $i$, motor X, brush $k$, blocks 21, 22 and brush $l$ to ground: and as the connections of motors W and Z are unaltered, it leaves the motors in four parallel branches.

Referring now to Fig. 3, the first condition with the motors all in series is shown by the first position and the next movement cuts out the resistance which is also in series with the motors leaving only the motors themselves in circuit. This is a running position.

In Fig. 4, it is shown that a loop including the resistance is first thrown around two motors, then the resistance is removed, and lastly, the two motors themselves, which have been shunted have their circuit interrupted. This is a second running position which is the last of the three shown in Fig. 4. In making the changes of Fig. 4, it will be understood that when the first two motors W and X of the series are shunted and thus rendered more or less inactive, the main part of the burden will be taken by the motors Y and Z, and it will furthermore appear by reference to Fig. 2, that the motors W and X are not placed upon the same truck or located together to form a pair, but that the motor W is grouped with the motor Y and the motor X with the motor Z, and it also appears that parallel rods are provided between the axles A, B and between the axles C, D the result being that although the motor W is inactive the motor Y will at the same time be active and will expend its energy not only upon its own axle, but upon the axle of the inactive motor W. In like manner, although the motor X may be inactive the motor Z at the same time will be active and drive both its own axle and that of the inactive motor X. Following the order in which the connections are established, we find in Fig. 5 the motors W and X themselves in series, but grouped in parallel with the motors Y and Z. In the sixth position the resistance R is in circuit with the motors W and X, while in the seventh position it is cut out, and this is a running position.

Fig. 6 shows the motors arranged as in Fig. 5, but with resistance loops around the motors Y and X; then the resistances are removed and the circuits of the shunted motors interrupted, which leaves a motor in each parallel branch. This is a running position. The motors Y and X are next connected with resistances in multiple with the motors W and Z; then the resistances are removed, as shown in Fig. 7, resulting in four multiple branches each having a motor for the final grouping, which is the fastest running position. It will be evident that under the conditions shown in Fig. 6 the motors X and Y will be inactive, and my invention may be carried still further by establishing a mechanical connection between the separate trucks, but this is ordinarily unnecessary. There are many ways of course, in which my invention may be carried into operation, but the general principle will remain the same, namely a compensation for the inequalities of load produced by a series parallel controller, which compensation is effected by means of a mechanical connection between separate axles driven by separate motors so that an active and inactive motor may be coupled together upon the same pair of axles.

What I claim as new, and desire to secure by Letters Patent of the United States, is—

1. In a vehicle, the combination with two or more trucks, each having a plurality of separately driven axles mechanically connected together, of means for simultaneously effecting the same change in the motive condition of each truck.

2. The combination with a vehicle, of a plurality of motors each geared to a separate axle, a controller for the motors comprising means for connecting them in series, in parallel or rendering certain of them inactive, and mechanical connections whereby all of the axles are constantly connected to active motors.

3. The combination with a vehicle having four axles and an electric motor driving each axle, of a controller for the motors consisting of a switch for placing them either in series or parallel connection, which at some points leaves part of the motors inactive, and mechanical devices connecting the axles in pairs, the respective axles of each pair being driven by motors that are affected by the controller correspondingly with the respective motors of the other pair of axles.

4. The combination with a vehicle having four axles, of a motor for driving each of the axles, a controller for the motors for connecting the same either in series or parallel and at some points shunting part of the motors, mechanical devices connecting the axles in pairs, one pair of axles being driven by motors one of which is shunted by the controller simultaneously with shunting the corresponding motor of the other pair of axles.

5. The combination with a vehicle having four axles, of an electric motor for driving each axle, a controller for the motors connecting the same either in series or parallel, and at some points shunting two of the motors while the other two motors remain active, mechanical devices connecting the axles in pairs, one axle of each pair being provided with a motor that is active while the other axle of each pair is provided with a motor that at times is shunted.

6. The combination with a vehicle of two motors driving the axles of said vehicle respectively, a controller adapted to place the motors in series, in parallel, or render one inactive, and a mechanical connection between the axles whereby the active motor may act upon both axles, as set forth.

7. The combination with a vehicle, of a plurality of motor trucks, each truck having two axles provided with propelling motors respectively, and a controller consisting of a series of relatively moving contact devices, for connecting the said motors in series, in parallel, or in groups, one position of which places all the motors in series, a second position renders inactive one motor of each truck, and a third position places all the motors in parallel.

8. The combination with a vehicle, of two motor trucks, each truck having two axles provided with propelling motors respectively, and a controller consisting of a series of relatively moving contact devices, for connecting the said motors in series, in parallel, or in groups, one position of which places the four motors in series, another position renders inactive one motor of each truck leaving two motors in series, a third position places the four motors in groups of two, a fourth position renders inactive one motor of each truck leaving the remaining motors in parallel, and a fifth position places all four motors in parallel.

In testimony whereof I have hereunto set my hand this 16th day of January, 1894.

WALTER H. KNIGHT.

Witnesses:
JOHN W. GIBBONEY,
BENJAMIN B. HULL.